C. R. HARVEY.
SPRING BED.
APPLICATION FILED OCT. 7, 1920.
1,414,277.
Patented Apr. 25, 1922.
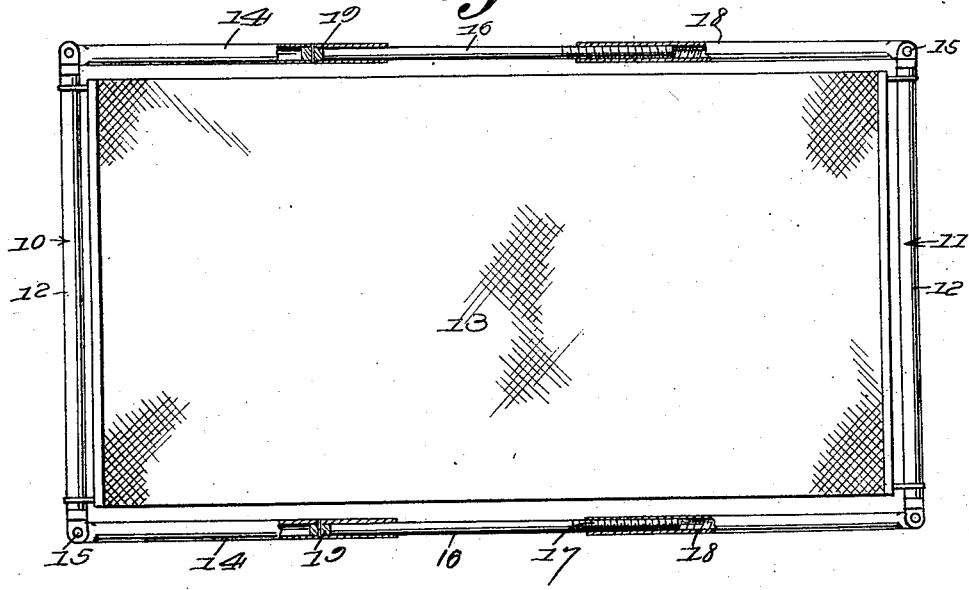
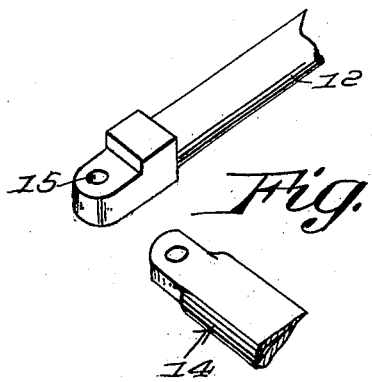
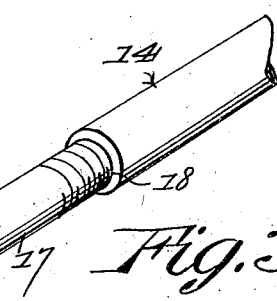
Inventor
C. R. Harvey,
By G. Hume Talbert
Attorney

UNITED STATES PATENT OFFICE.

CLARENCE R. HARVEY, OF BEND, OREGON.

SPRING BED.

1,414,277.  Specification of Letters Patent.  Patented Apr. 25, 1922.

Application filed October 7, 1920. Serial No. 415,300.

*To all whom it may concern:*

Be it known that I, CLARENCE R. HARVEY, a citizen of the United States of America, residing at Bend, in the county of Deschutes and State of Oregon, have invented new and useful Improvements in Spring Beds, of which the following is a specification.

The object of the invention is to provide a knock-down spring bed frame adapted to be rapidly reduced to a portable condition and having means whereby the elements thereof may be adjusted to apply the desired tension to the filler when the device is set up for use, and with this object in view, the invention consists in a construction and combination of parts, of which a preferred embodiment is shown in the accompanying drawing, wherein:—

Figure 1, is a plan view partly in section of a spring bed having a frame embodying the invention.

Figure 2, is a detail sectional view of one of the corner joints.

Figure 3, is a similar view of one of the side members to show the means for connecting the end members of the frame and tensioning the filler which is terminally supported thereby.

The bed bottom consists essentially of a frame having end members 10 and 11, each of which includes a cross bar 12, and a filler 13 supported by the frame and terminally attached to the cross bars and adapted to be placed in tension to afford the desired resistance to support a weight imposed thereon. Each end member in addition to the cross bar which may consist of a tube includes side arms 14 pivotally connected as at 15 to the extremities of the cross bar to permit of folding the arms in parallel or substantially parallel relation with the cross bar to the end that the frame, when its members are disconnected may be compactly stored in a comparatively small space. Said side arms are also preferably tubular in form and the adjacent extremities thereof are connected by coupling elements 16, which consist of rods or tubes of relatively smaller diameter than those of the side arms, one end of each coupling member being threaded as indicated at 17 to fit within and engage the interior threads 18 of the arms of the frame member 11 while the other end thereof is adapted to fit into the end of the corresponding arm of the frame member 10 the extent of insertion being limited by a stop 19 consisting of a plug or block as indicated.

In assembling the parts of the frame, the threaded extremities of the connecting elements should be seated in the threaded extremities of the arms of the member 11 and the plain smooth terminals of said connecting elements fitted into the arms of the member 10 and after the extremities of the filler 13 have been engaged with the cross bars 12 said connecting or coupling elements may be turned to force the end members of the frame outward or from each other by reason of the threaded connections 17 and 18 applying the desired tension to the filler. Obviously the folding of the frame for transportation or storage may be effected by reversing the indicated operation and the entire structure may be folded or rolled into a compact form which may be stored in a trunk or may be conveniently carried as a part of the equipment of an automobile or like vehicle.

The invention having been described, what is claimed as new and useful is:—

A foldable spring bed having a frame comprising end members each of which consists of a cross bar, tubular side arms pivotally connected to the end members, coupling elements terminally fitted in the extremities of the side arms and formed at one end with exterior threads engaging interior threads in certain of the side arms, plugs carried on the interior of the remaining side arms and inset from the extremities of the latter, the remaining ends of the coupling elements slidably engaging the said remaining side arms and abutting said plugs, and a filler tensioned between opposite end members.

In testimony whereof he affixes his signature.

CLARENCE R. HARVEY.